United States Patent [19]
Jung

[11] Patent Number: 5,600,688
[45] Date of Patent: Feb. 4, 1997

[54] TOOL FOR INSTALLING HARDWARE FOR RADIALLY SUPPORTING VERTICAL RESTRAINT TIE ROD

[75] Inventor: Wing G. Jung, Cupertino, Calif.

[73] Assignee: General Electric Company, San Jose, Calif.

[21] Appl. No.: 532,910

[22] Filed: Sep. 22, 1995

[51] Int. Cl.⁶ .................................................. G21C 19/00
[52] U.S. Cl. ...................................... 376/260; 294/67.22
[58] Field of Search ................................. 376/260, 463; 254/29 A, 29 R, 133 R; 269/1; 414/146; 294/67.1, 67.31, 67.41, 67.2, 67.22

[56] References Cited

U.S. PATENT DOCUMENTS

| | | | |
|---|---|---|---|
| 3,219,216 | 11/1965 | Pinaud | 294/67.22 |
| 5,402,570 | 4/1995 | Weems et al. | 376/302 |
| 5,430,779 | 7/1995 | Baversten et al. | 376/302 |
| 5,502,754 | 3/1996 | Erbes | 376/302 |

*Primary Examiner*—Daniel D. Wasil
*Attorney, Agent, or Firm*—James E. McGinness

[57] ABSTRACT

A tool for installing a support member which must be rotated into a horizontal position in the downcomer annulus of a boiling water reactor by remote manipulation. The support member may, for example, be a midsupport for damping flow-induced vibrations in a vertical restraint tie rod. The tool includes a rigid holder for holding the support member and a threaded pivot for coupling with the threaded end of a cable. The pivot can swing relative to the holder between first and second angular positions separated by 90°. The support member is held in the holder by a pair of channels formed on the holder and a set screw which threads in the holder and enters a bore formed in the support member. After the support member has been secured to the holder, the holder is coupled to the end of the cable via the pivot. The support member is lowered in the downcomer annulus in a vertical position. When the support member reaches the installation elevation, the support member is pivoted into a horizontal position for engagement with the tie rod. The tool is disengaged from the installed support member by remote manipulation of the set screw.

5 Claims, 6 Drawing Sheets

TOOL FOR INSTALLING HARDWARE FOR RADIALLY SUPPORTING VERTICAL RESTRAINT TIE ROD

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

Figure 1:
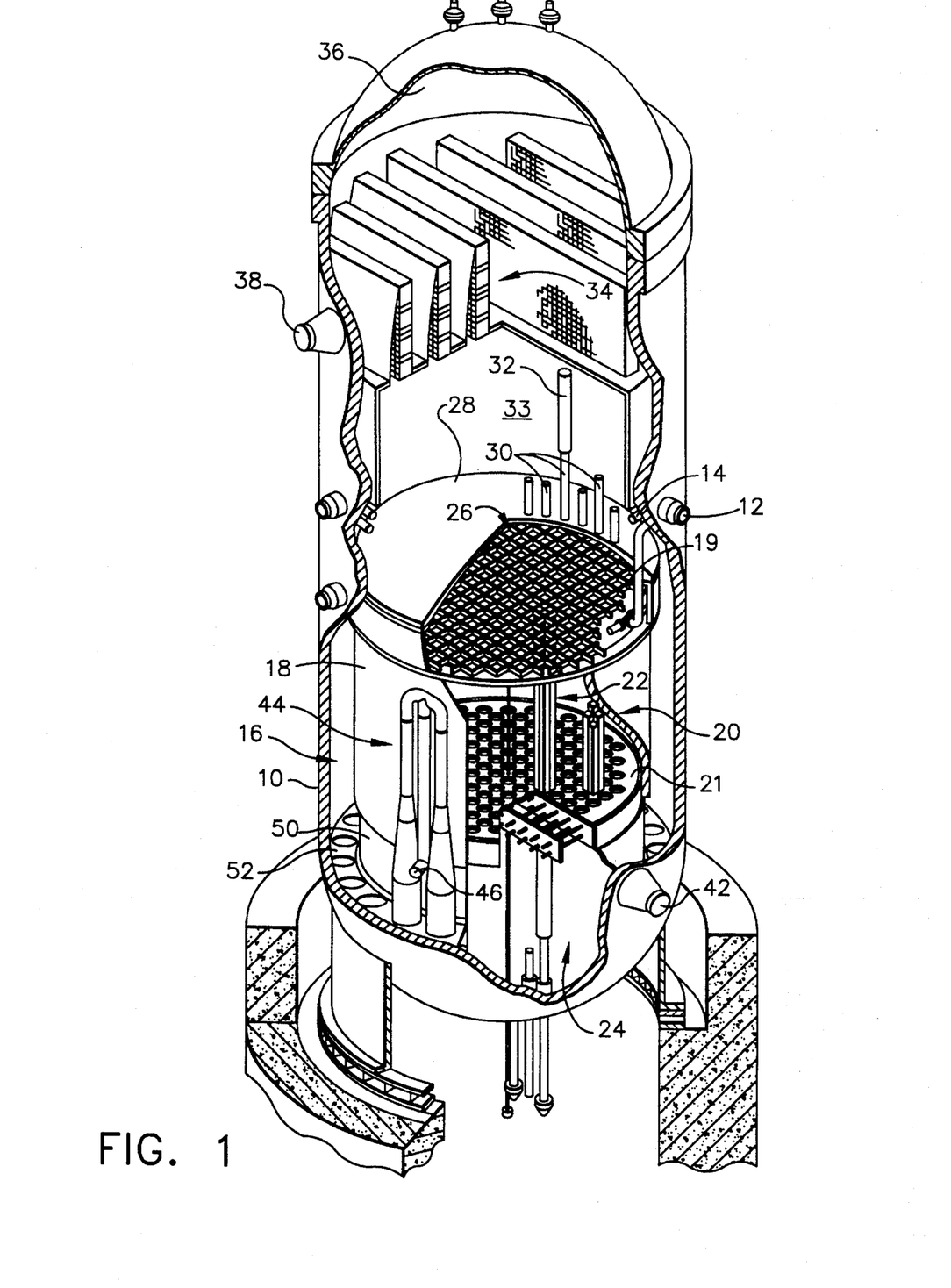
FIG. 1 is a schematic showing a partially cutaway perspective view of a conventional BWR.

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. The feedwater from sparger 14 flows downwardly through the downcomer annulus 16, which is an annular region between RPV 10 and core shroud 18.

Core shroud 18 is a stainless steel cylinder surrounding the nuclear fuel core 20. Core 20 is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Vertical standpipes 30 atop shroud head 28 are in fluid communication with core upper plenum 26. The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is conducted from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 42 and forced by a centrifugal recirculation pump (not shown) into jet pump assemblies 44 (only one of which is shown) via recirculation water inlets 46. The BWR has two recirculation pumps, each of which provides the driving flow for a plurality of jet pump assemblies. The jet pump assemblies are circumferentially distributed around the core shroud 18.

The core shroud 18 (see FIG. 2) comprises a shroud flange 18a for supporting the shroud head 28; a circular cylindrical upper shroud wall 18b having a top end welded to shroud flange 18a; an annular top guide support ring 18c welded to the bottom end of upper shroud wall 18b; a circular cylindrical middle shroud wall comprising three sections 18d, 18e and 18f welded in series, with a top end of section 18d being welded to top guide support ring 18c; and an annular core plate support ring 18g welded to the bottom end of middle shroud wall section 18f and to the top end of a lower shroud wall 18h. The entire shroud is supported by a shroud support 50, which is welded to the bottom of lower shroud wall 18h, and by annular shroud support plate 52, which is welded at its inner diameter to shroud support 50 and at its outer diameter to RPV 10.

Figure 2:
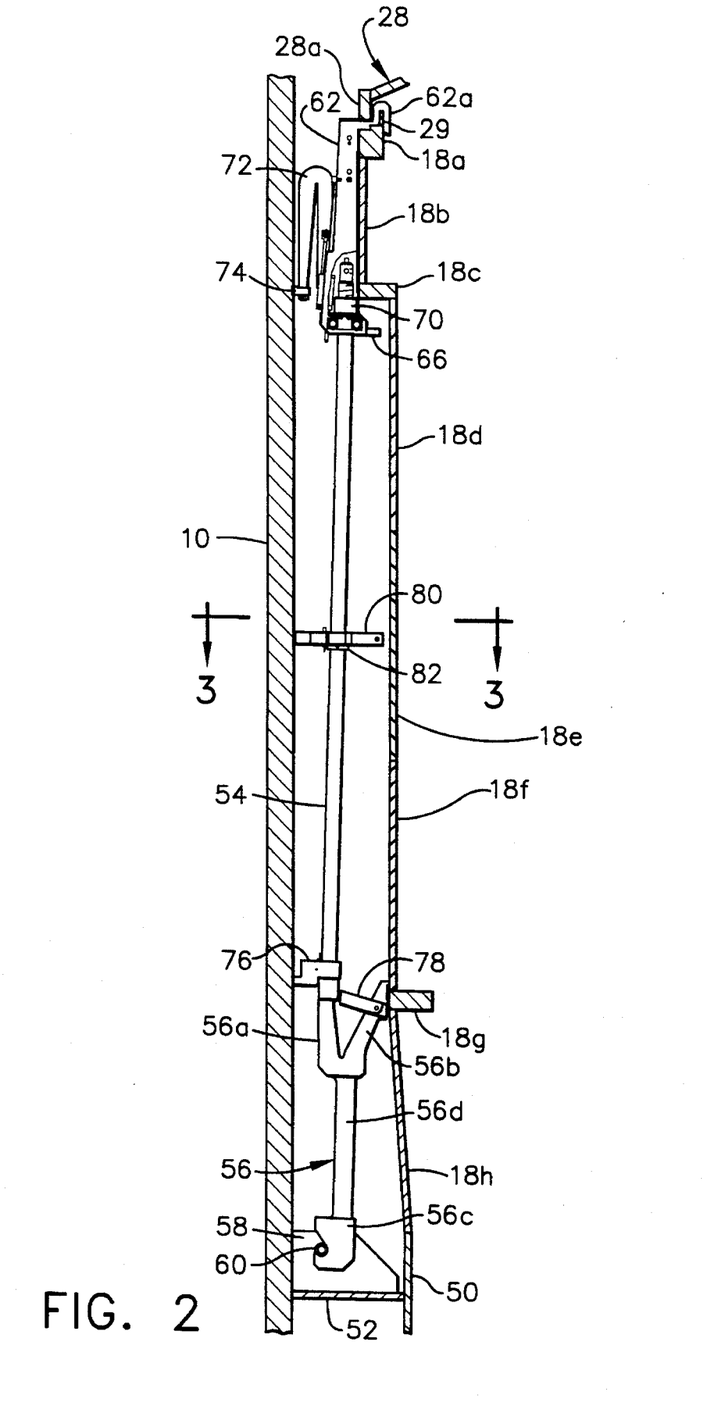
FIG. 2 is an elevation view of a core shroud which is vertically restrained by a tie rod preloaded to mitigate flow-induced vibrations.

In the event of a seismic disturbance, it is conceivable that the ground motion will be translated into lateral deflection relative to the reactor pressure vessel of those portions of the shroud located at elevations above shroud support plate 52. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 18, which vertically and horizontally supports core top guide 19 and shroud head 28. In particular, a cracked shroud increases the risks posed by a loss-of-coolant accident (LOCA). During a LOCA, the loss of coolant from the reactor pressure vessel produces a loss of pressure above the shroud head 28 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

Some repair methods for vertically restraining a weakened core shroud utilize tensioned tie rods coupled to the shroud flange and to the shroud support plate. To mitigate the adverse effects on the tie rods of vibrations induced by the coolant flow in the downcomer annulus, a mid-support is wedged between the tie rod and the reactor pressure vessel with preload. The midsupport has a configuration such that it must be held with a first orientation in order to pass between obstacles during lowering in the downcomer annulus and then must be rotated to adopt a second orientation for engaging the tie rod. Each of these operative steps must be performed underwater by remote manipulation of tools suspended from the refueling bridge by poles or cables.

SUMMARY OF THE INVENTION

The present invention is a tool for installing a support member which must be rotated into a horizontal position in the downcomer annulus of a boiling water reactor by remote manipulation. In particular, the invention is a tool for installing a mid-support for damping flow-induced vibrations in a vertical restraint tie rod. The tool comprises a rigid holder for holding the support member and a threaded pivot for coupling with the threaded end of a cable. The pivot can swing relative to the holder between first and second angular positions separated by 90°. The support member is held in the holder by a pair of channels formed on the holder and a set screw which threads in the holder and enters a bore formed in the support member.

After the support member has been secured to the holder, the holder is coupled to the end of the cable via the pivot, which is aligned with the cable axis. When the pivot is in the first angular position relative to the holder, the support member suspended from the cable is in a vertical position. The support member is designed to extend in a horizontal position across nearly the entire width of the downcomer annulus, but has a narrow profile. Therefore, the support member can be lowered in the downcomer annulus more easily if the support member is suspended from the hoist cable in the vertical position. However, when the support member reaches the elevation where the support member is to be finally installed, the support member must be pivoted into a horizontal position for engagement with the tie rod, as described in detail hereinafter.

To enable preloading of the tie rod, the tie rod must be deflected at a point along its span. The vertically oriented support member is then lowered to the desired elevation in the annulus. At the desired elevation, the support member, which is still suspended from the cable, is swung from the vertical position to the horizontal position by remote manipulation using a rope tied to an eyelet on the holder. After the support member has engaged the tie rod, the deflected tie rod is released, but does not return to its fully undeflected state due to opposition of the support member. The result is that the released tie rod bears against the support member with the desired preload. Then the installation tool is removed.

DETAILED DESCRIPTION OF THE PREFERRED EMBODIMENTS

Referring to FIG. 2, a shroud restraint tie rod assembly comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 18c. The upper end of tie rod 54 has a threaded portion.

The lower spring 56 is anchored to a gusset plate 58 attached to the shroud support plate 52. The lower spring 56 has a slotted end which straddles gusset plate 58 and forms a clevis hook 56c. The clevis hooks under opposite ends of a clevis pin 60 inserted through a hole machined in the gusset plate 58. Engagement of the slotted end with the gusset plate 58 maintains alignment of lower spring 56 under the action of seismic motion of the shroud, which may be oblique to the spring's radial orientation.

The tie rod 54 is supported at its top end by an upper support assembly which hangs on the shroud flange. A pair of notches or slots are machined in the shroud head ring 28a of shroud head 28. The notches are positioned in alignment with a pair of bolted upper support plate segments 62 of the upper support assembly when the shroud head 28 is properly seated on the top surface of shroud flange 18a. These notches facilitate the coupling of the tie rod assembly to the shroud flange.

The pair of notches at each tie rod azimuthal position receive respective hook portions 62a of the upper support plates 62. Each hook 62a conforms to the shape of the top surface of shroud flange 18a and the shape of the steam dam 29. The distal end of hook 62a hooks on the inner circumference of shroud dam 29.

The upper support plates 62 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 is passed through the bore, a threaded tensioning nut 70 is screwed onto the threaded portion of tie rod 54.

The assembly comprised of support plates 62 with hooks 62a, support block 66, tie rod 54, lower spring 56, clevis pin 60 and gusset plate 58 form a vertical load path by which the shroud flange 18a is connected to the shroud support plate 52. In the tensioned state, upper support plates 62 exert a restraining force on the top surface of the shroud flange 18a which opposes separation of the shroud at any assumed failed circumferential weld location.

Lateral restraint at the elevation of the top guide support ring 18c is provided by an upper spring 72 having a double cantilever "wishbone" design. The end of the radially outer spring arm has an upper contact spacer 74 rotatably mounted thereon which bears against the inner surface of the RPV wall 10.

Referring back to FIG. 2, the spring arm 56a of lower spring 56 laterally supports the shroud 18 at the core plate 18e, against the vessel 10, via a lower contact spacer 76. The lower spring assembly is installed with a controlled preload, obtained by machining the contact pad of spacer 76 to match the measured assembly fitup. The top end of spring arm 56a has a threaded bore to provide the attachment for the bottom of the tie rod 54.

The member 56d connecting the upper wishbone spring 56a, 56b to the clevis hook 56c is offset from the line of action between the lower end of tie rod 54 and the clevis pin 60 to provide a vertical spring compliance in the load path to the tie rod. Axial loads in the tie rod cause bending of the lower connecting member 56d and associated pivoting of the clevis hook 56c about the clevis pin 60. The specific configuration is designed to add the desired axial flexibility to the assembly to minimize loads on the tie rod due to differential thermal expansion, which could induce residual stress and cracking, or due to tilting motion of the shroud from seismic loads which could overload the tie rod.

The lateral seismic loads from the main mass of the reactor core are reacted (for a cracked shroud) by the upper and lower springs at the top guide 18c and core plate 18e, respectively. Gross motion limit stops are also mounted on the stabilizers to limit lateral displacement of other segments of the shroud due to circumferential weld failures. Each upper support block 66 has a limit stop which blocks gross lateral deflection of the middle shroud wall 18d relative to the top guide support ring 18c in the event that the welds between top guide support ring 18c and middle shroud wall 18d become severed. The limit stop 78 provides protection against permanent deformation of arms 56a and 56b in the unlikely event seismic loads exceed the plant's licensed design values.

Figure 3:
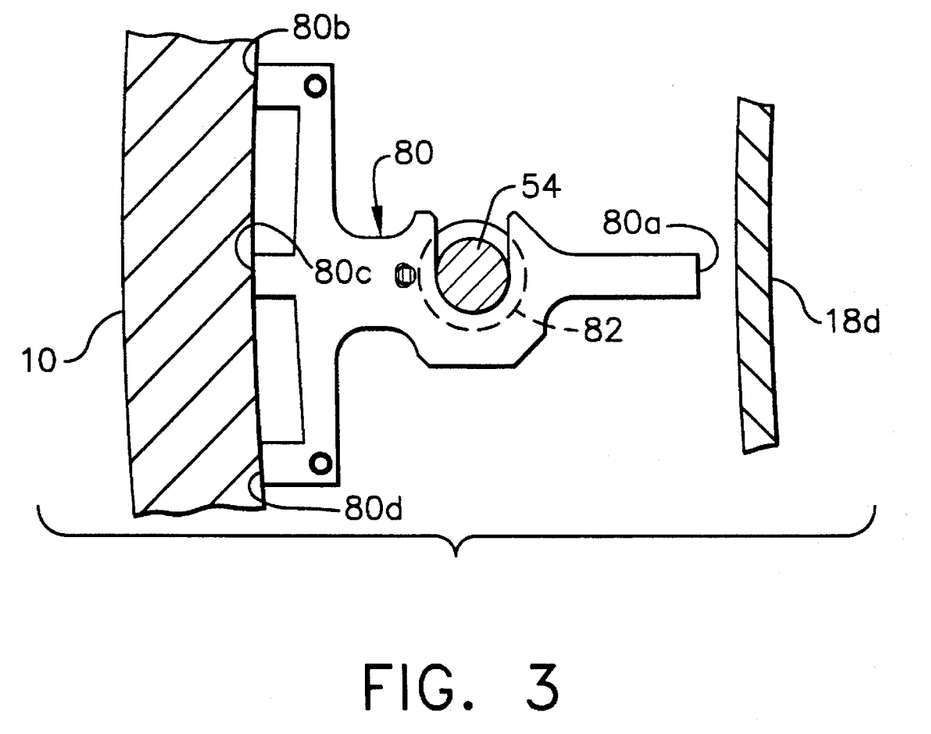
FIG. 3 is a plan view taken along section lines 3—3 seen in FIG. 2.

A middle support 80 provides a limit stop 80a, as shown in FIG. 3. The middle support 80 is preloaded against the vessel wall at assembly by radial interference which bends the tie rod 54. The contact pads 80b–80d are machined to mate with the vessel wall 10 such that the desired preload is produced in the tie rod. Thus, middle support 80 provides both a limit stop for the middle shroud wall 18d, and a mid-span support for the tie rod, improving its resistance to vibratory excitation failure. To facilitate mounting of the middle support 80, a mid-support ring 82 is secured to the tie rod 54, as shown in FIG. 2. The middle support 80 has a section of an annular recess counterbored in its bottom which form fits on ring 82, thereby preventing lateral shifting of middle support 80 relative to tie rod 54. The middle support 80 is latched to midsupport ring 82 by a spring latch (not shown), which blocks upward vertical displacement of middle support 80 relative to the tie rod 54.

Figure 4:
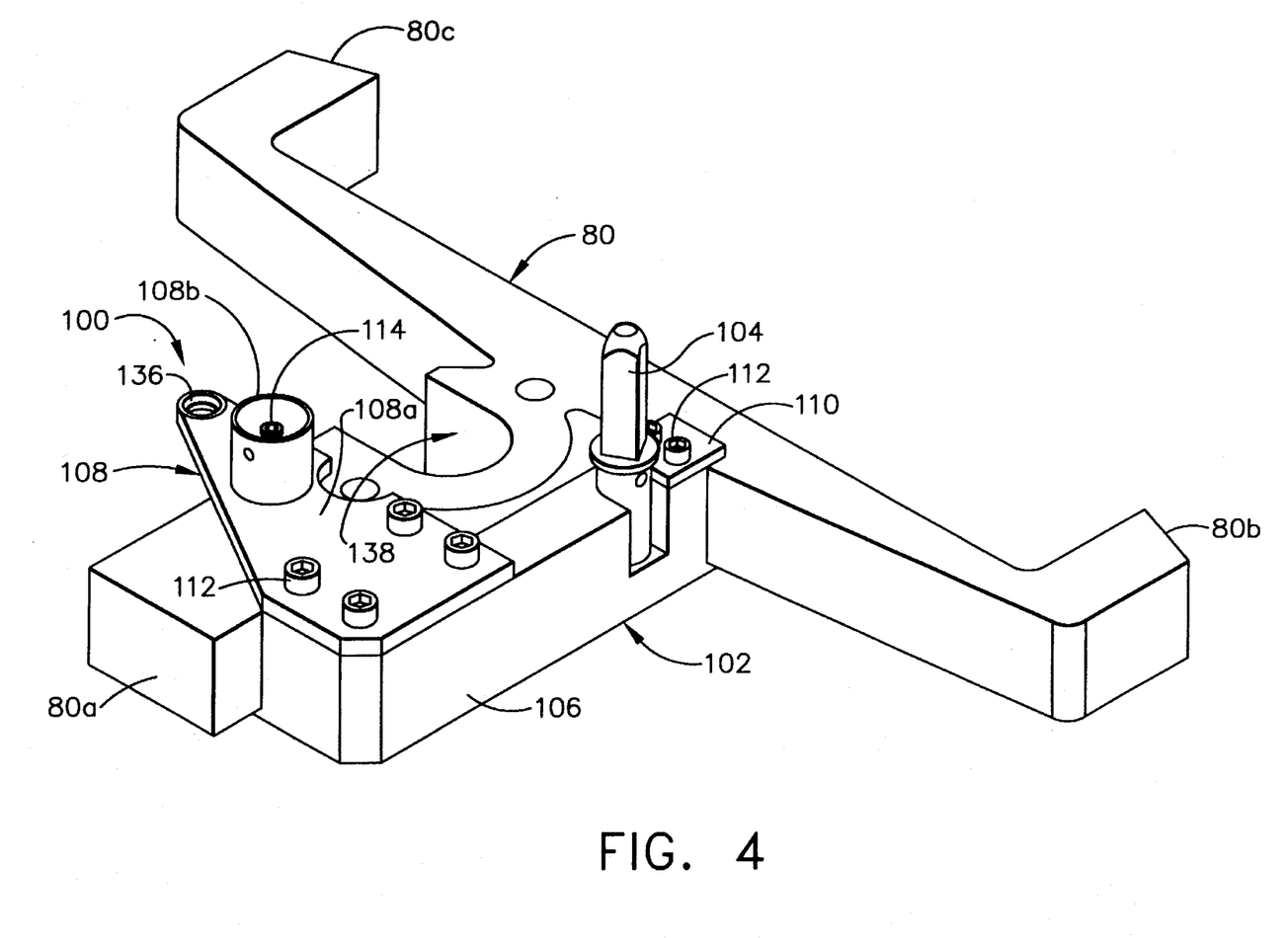
FIG. 4 is an isometric view of the installation tool in accordance with the preferred embodiment of the invention, showing the tool when the mid-support is oriented generally horizontally.

Although FIG. 3 depicts a middle support having three contact pads which bear against the reactor pressure vessel wall, the middle support may optionally have only two contact pads 80b and 80c, as depicted in FIG. 4.

During installation of the shroud restraint hardware, the middle support 80 is coupled to the end of a cable (not shown) by means of the installation tool 100 shown in FIG. 4. The tool 100 comprises a rigid holder 102 for holding the middle support 80 and a threaded pivot 104 for coupling with a threaded end of the cable. The holder comprises a block or frame 106 which has a pair of coplanar flanges 106a and 106b, the top surfaces of which contact the bottom surface of the mid-support 80. The holder further comprises an arm weldment 108 and a plate 110 attached to block 106 by means of set screws 112. Arm weldment 108 in turn comprises an arm 108a and a bar 108b which is welded to arm 108a. Arm 108a is a plate disposed coplanar with plate 110. The bottom surfaces of plates 108a and 110 contact the top surface of mid-support 80. The flanges and plates, in combination with respective non-parallel vertical planar surfaces 106a and 106b of block 106, form first and second channels which respectively receive first and second portions of the support member. The channels prevent displacement of the support member relative to the holder in directions perpendicular to the plane of plates 108a and 110.

Figures 6, 7:
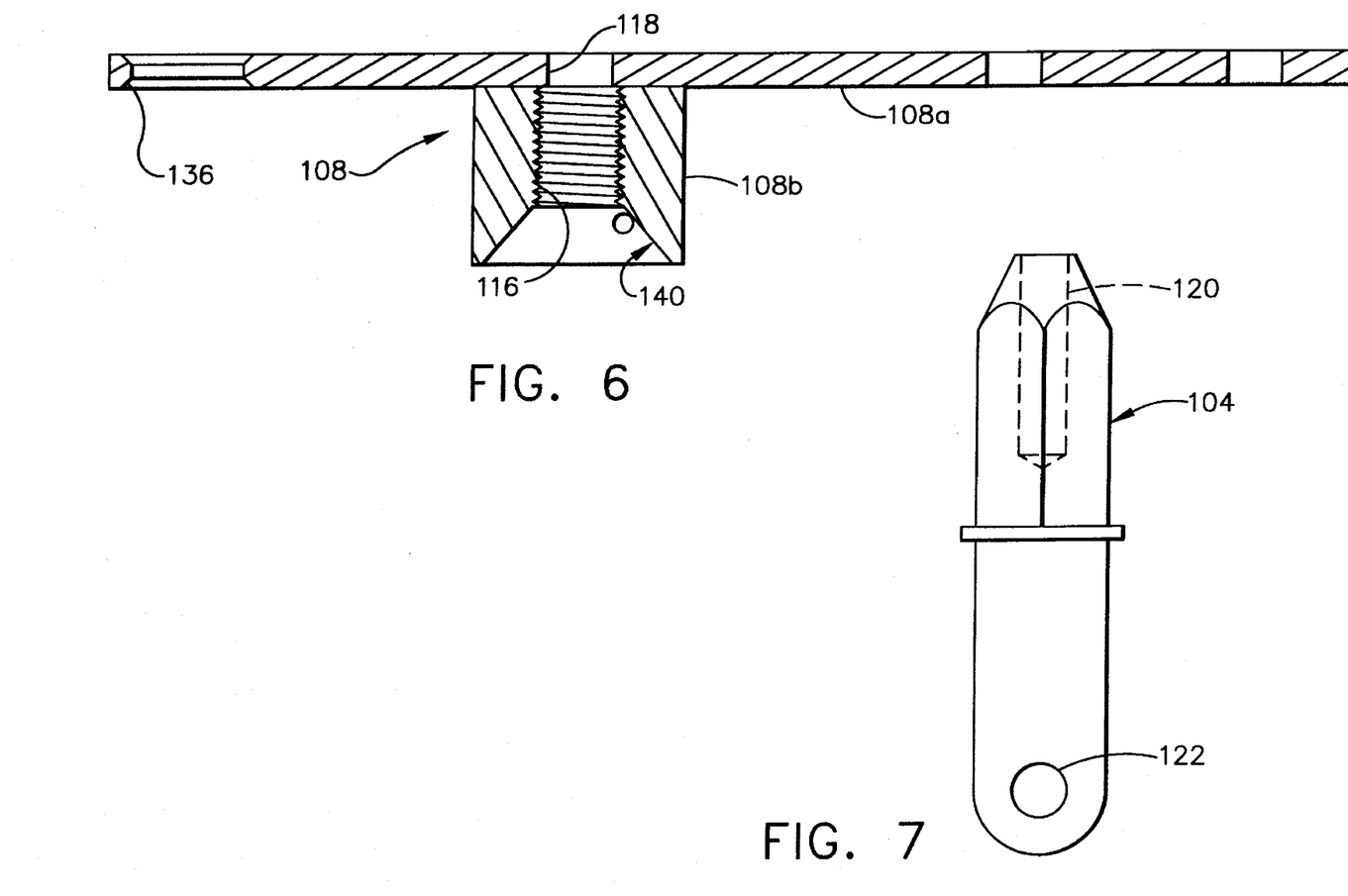
FIG. 6 is a sectional view of an arm weldment incorporated in the installation tool shown in FIG. 4.
FIG. 7 is an elevational view of a pivot incorporated in the installation tool shown in FIG. 4.

Displacement of the support member 80 relative to the holder 102 in a direction parallel to the plane of plates 108a and 110 is prevented by a set screw 114 which is screwed into a threaded throughhole 116 in bar 108b (see FIG. 6). Throughhole 116 has an axis perpendicular to the plane of arm 108a. The threaded throughhole 116 communicates with a throughhole 118 in arm 108a. The throughhole 118 in turn communicates with a bore (not shown) in the support member when the support member and holder are properly coupled. To lock the holder onto the support member, set screw 114 is screwed into the threaded throughhole 116 until the tip of set screw 114 has penetrated into the bore in the support member, locking it in position.

The pivot 104 has a threaded bore 120 (see FIG. 7) which receives the threaded end of a hoist cable (not shown). The pivot 104 also has a transverse circular cylindrical bore 122 for receiving the shaft of a pivot pin (not shown). The pivot pin has a threaded end of first diameter which engages a threaded bore 124 (SEE FIG. 5A) formed in block 102. The shaft of the pivot pin is rotatably seated in unthreaded circular cylindrical bores 126a and 126b of second diameter formed in block 102. The second diameter is greater than the first diameter. Bore 126b communicates with threaded bore 124. Bore 126a communicates with a circular cylindrical bore 128 of third diameter greater than the second diameter.

Figure 5A:
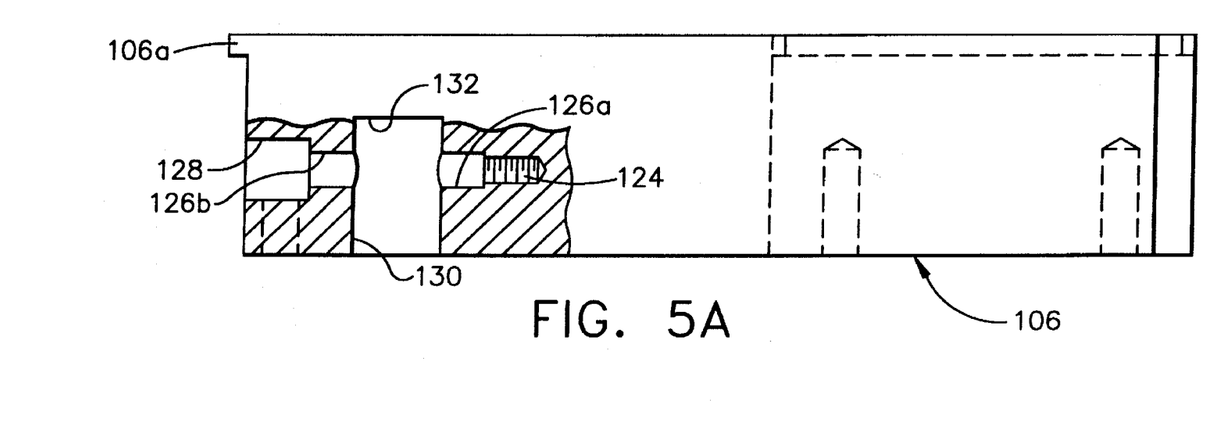
FIGS. 5A and 5B are elevation and plan views of a block incorporated in the installation tool shown in FIG. 4.
Figure 5B:
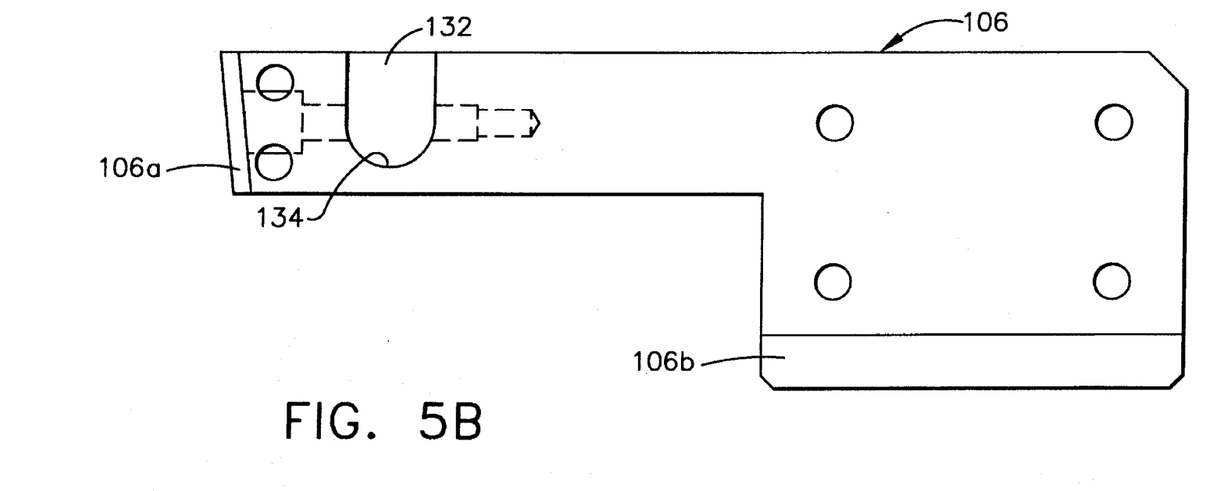

Block 102 is further provided with a recess 130 which communicates on opposing sides thereof with bores 126a and 126b respectively. Recess 130 has a flat bottom 132, which blocks clockwise rotation of pivot 104 at the first angular position, and a semicylindrical surface 134, which blocks counterclockwise rotation of pivot 104 at the second angular position. The axis of semicylindrical surface 134 is perpendicular to flat surface 132, so that the first and second angular positions of pivot 104 are separated by 90°.

When the pivot 104 is coupled to the cable and is pivoted to the first angular position relative to the holder, the support member 80 will be suspended from the cable in a vertical position. The second angular position of the pivot 104, corresponding to the installed position of mid-support 80, is shown in FIG. 4. The extension of arm 108a has an eyelet 136 to which a rope or wire is tied prior to installation. That rope or wire can be manipulated remotely to pivot the support member from a vertical position to a horizontal position at the elevation of final installation. The outer surface of the pivot 104 has a non-circular cross section which allows the entire tool to be rotated about a vertical axis by remote manipulation of an appropriate tool.

To enable preloading of the tie rod, the tie rod must be deflected at a point along its span using a remotely operated deflecting tool (not shown) comprising a hydraulic cylinder which pushes radially inward from the RPV wall. The vertically oriented support member is then lowered to the desired elevation in the annulus. At the desired elevation, the support member, which is still suspended from the cable, is swung from the vertical position to the horizontal position by remote manipulation using the rope tied to eyelet 136. Another hydraulic tool (not shown) is remotely operated to pull the suspended support member tangentially so that recess 138 of the mid-support 80 engages the tie rod 54. The deflected tie rod is then released, but does not return to its fully undeflected state due to the opposition of mid-support 80. The result is that released tie rod 54 bears radially outward against mid-support 80 with the desired preload.

After the support member has been installed so that the tie rod is preloaded, the installation tool can be removed. The tool is removed by unscrewing set screw 114 using an adaptor (not shown) mounted on the end of a conventional service pole (not shown), which is manually rotated. The bar 108b is provided with a conical chamfer 140 for guiding the adaptor into engagement with the set screw. When the set screw is retracted and no longer interferes with the support member, the tool can be pulled horizontally away from the installed support member. The disengaged installation tool is then hoisted out of the annulus.

The preferred embodiment of the mid-support installation tool in accordance with the invention has been disclosed for the purpose of illustration. Variations and modifications of the disclosed structure which fall within the concept of this invention will be readily apparent to persons skilled in the art of tooling design. For instance, the preferred embodiment of the invention utilizes plates screwed onto a block for ease of construction. However, it will be apparent to the skilled tooling designer that the block and plates which form the channels for receiving the support member can be formed as an integral unit. All such variations and modifications are intended to be encompassed by the claims set forth hereinafter.

I claim:

1. A tool for remotely positioning a shroud repair component to be installed in an annulus between a shroud and a reactor pressure vessel of a nuclear reactor, comprising:

a frame having first and second linear channels, said first channel being formed in part by a first planar surface which is substantially perpendicular to a reference plane and said second channel being formed in part by a second planar surface which is substantially perpendicular to said reference plane but is not parallel to said first planar surface;

an arm connected to said frame and extending parallel to said reference plane, said arm having a throughhole extending perpendicular to said reference plane;

a bar having a threaded throughhole, said bar being connected to said arm at a location such that said threaded throughhole is aligned and communicates with said throughhole in said arm;

a set screw threadably engaged in said threaded throughhole; and a pivot pivotably coupled to said frame.

2. The tool as defined in claim 1, wherein said frame has a recess which limits rotation of said pivot beyond a 90° arc.

3. The tool as defined in claim 1, wherein said pivot has a threaded axial bore for engaging a threaded cable coupling.

4. The tool as defined in claim 1, wherein said arm has a distal end with an eyelet formed therein.

5. The tool as defined in claim 1, wherein said bar has a conical chamfer extending from one end of said threaded throughhole.

* * * * *